(12) United States Patent
Willard

(10) Patent No.: US 6,374,405 B1
(45) Date of Patent: Apr. 16, 2002

(54) MODULE SCHEDULING WITH A TIME INTERVAL AND ENDING TIME

(75) Inventor: Pierre Willard, Palo Alto, CA (US)

(73) Assignee: OpenTV, Corp., Mountainview, CA (US)

( * ) Notice: Subject to any disclaimer, the term of this patent is extended or adjusted under 35 U.S.C. 154(b) by 0 days.

(21) Appl. No.: 09/251,838

(22) Filed: Feb. 17, 1999

(51) Int. Cl.⁷ .................. H04N 7/173; H04N 7/16
(52) U.S. Cl. .................. 725/94; 725/94; 725/97; 725/116; 725/138
(58) Field of Search .................. 725/93, 94, 97, 725/101, 103, 116, 132, 136, 138, 140, 152; 370/517, 519

(56) References Cited

U.S. PATENT DOCUMENTS

| | | | |
|---|---|---|---|
| 5,442,389 A | * 8/1995 | Blahut et al. | 725/92 |
| 5,533,021 A | * 7/1996 | Brandstad et al. | 370/452 |
| 5,548,532 A | 8/1996 | Menand et al. | |
| 5,566,174 A | * 10/1996 | Sato et al. | 370/468 |
| 5,986,690 A | * 11/1999 | Hendricks | 725/60 |
| 6,240,555 B1 | * 5/2001 | Shoff et al. | 725/110 |

FOREIGN PATENT DOCUMENTS

| | | |
|---|---|---|
| EP | 0 399 200 | 11/1990 |
| EP | 0 690 400 | 1/1996 |
| WO | 98/57497 | 12/1998 |

OTHER PUBLICATIONS

International Search Report for Application No. PCT/US 00/03598, mailed Jun. 19, 2000.

* cited by examiner

Primary Examiner—Andrew Faile
Assistant Examiner—Dimitri Tundra
(74) Attorney, Agent, or Firm—Conley, Rose & Tayon, PC; Rory D. Rankin

(57) ABSTRACT

A system and method implemented in an interactive television system for scheduling delivery of modules of interactive television applications from a broadcast station to a receiving station. In one embodiment, the system calculates a start time from a predetermined end time and transmission interval for a module. In other embodiments, a transmission interval may be calculated instead of being predetermined, or all of the scheduling information may be explicitly provided to the broadcast station. The module is packetized and transmission of the packets for the module is begun at the corresponding start time. All of the packets except the last packet are transmitted within the transmission interval (i.e., between the start time and the delivery time.) The greater the transmission interval, the greater the flexibility the broadcast station has to schedule delivery of the packets and modules. The last packet is held until the scheduled delivery time and is then transmitted. Because a module is considered to have been delivered to the receiving station when the last packet is received, the delivery time of the module is controllable to within the limits of the last packet's delivery.

22 Claims, 5 Drawing Sheets

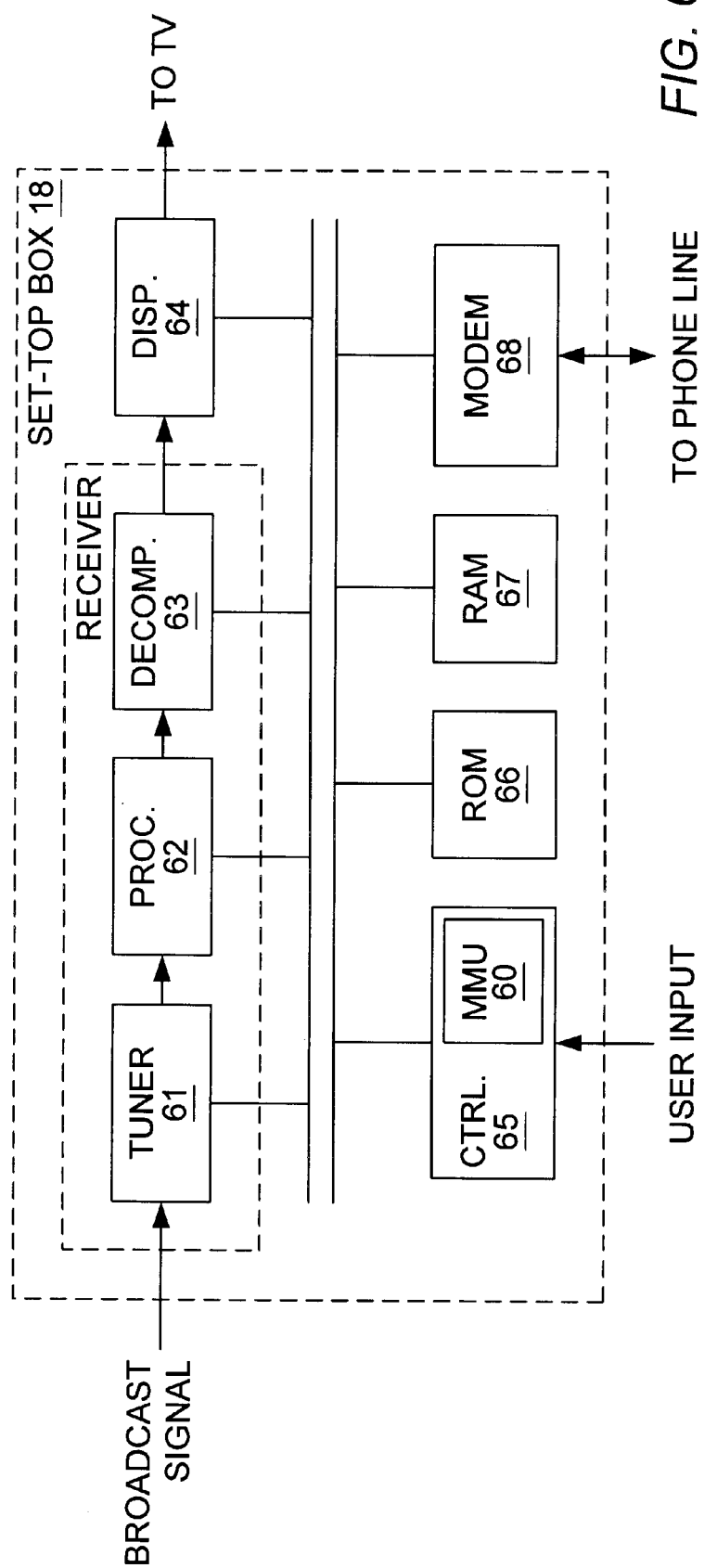

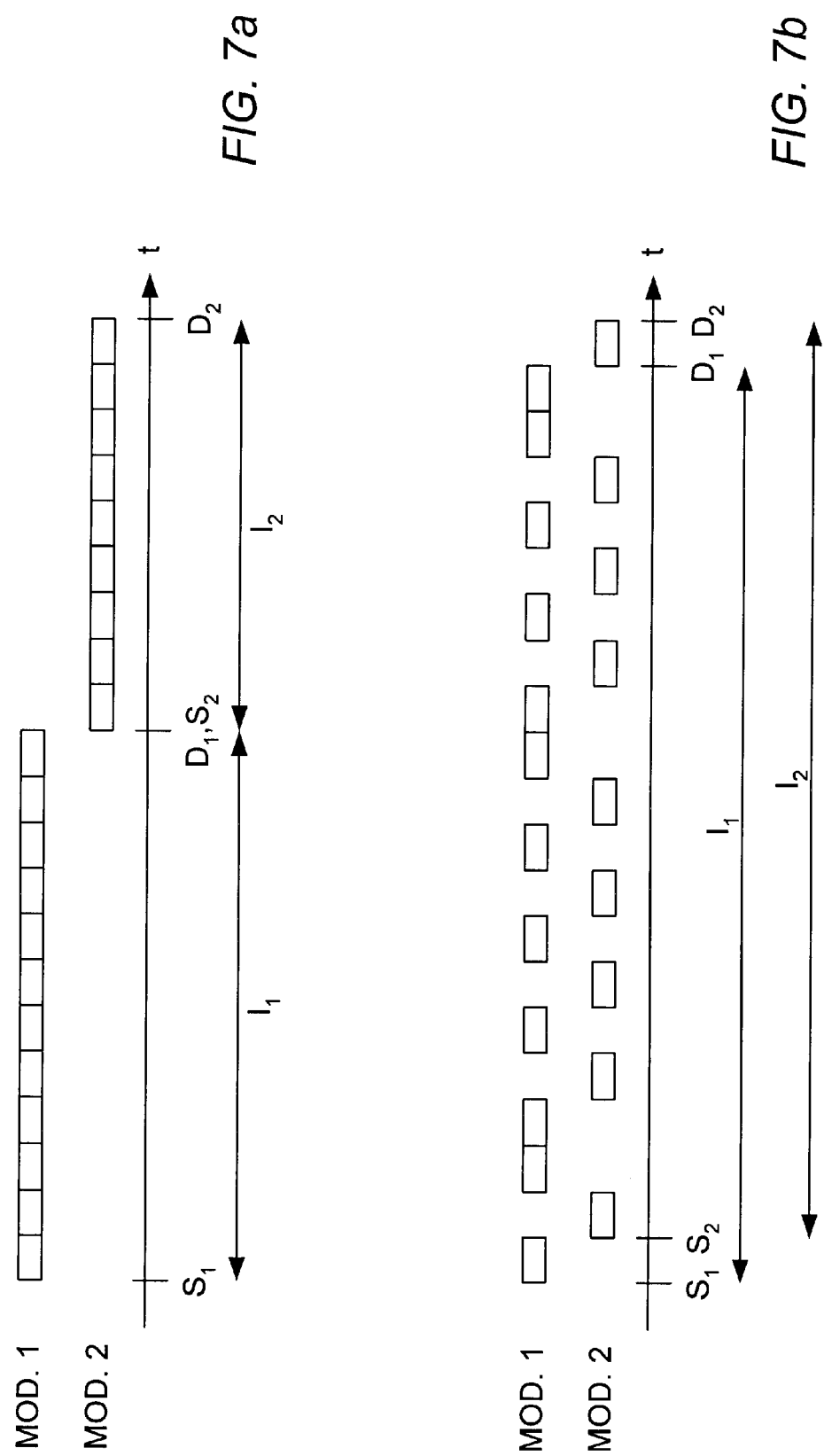

MODULE SCHEDULING WITH A TIME INTERVAL AND ENDING TIME

BACKGROUND OF THE INVENTION

1. Field of the Invention

The invention relates to interactive television systems and more particularly to scheduling the delivery of application modules which are to be transmitted to an interactive television receiver.

2. Description of the Related Art

Interactive television systems are capable of displaying text and graphic images in addition to typical video program streams and are useful to provide a number of services and interactive applications to viewers. Interactive television systems are also capable of registering viewer actions in response to the audio and video information presented by the system. Features of interactive television include a variety of marketing, entertainment and educational capabilities such as allowing a user to interact with televised programs by ordering advertised products or services, competing against contestants in a game show, or requesting specialized information regarding particular programs.

Typically, a broadcast service provider generates an interactive television signal for transmission to a viewer's television. The interactive television signal includes an interactive portion consisting of application code or control information, as well as an audio-video portion consisting of a television program. The broadcast service provider combines the audio-video and interactive portions into a single signal for transmission to a receiver connected to the user's television. The signal is generally compressed prior to transmission and transmitted through typical broadcast channels, such as cable television (CATV) lines or direct satellite transmission systems.

The interactive functionality of the television is controlled by a set-top box connected to the television. The set-top box receives the signal transmitted by the broadcast service provider, separates the interactive portion from the audio-video portion and decompresses the respective portions of the signal. The set-top box uses the interactive information to, for example, execute an application while the audio-video information is transmitted to the television. The set-top box may combine the audio-video information with interactive graphics or audio generated by the interactive application prior to transmitting the information to the television. The interactive graphics and audio may present additional information to the viewer or may prompt the viewer for input. The set-top box may provide viewer input or other information to the broadcast service provider via a modem connection.

Interactive television applications may consist of a set of program modules. The entire set of modules is transmitted via the broadcast channel to the set-top box and the application is executed. The modules are packetized before they are transmitted to the receiving station. That is, the modules are broken down into smaller pieces of information which are then formatted for transmission over the broadcast channel or other transmission medium. The packets containing the pieces of a particular module may be transmitted consecutively, or they may be interspersed with packets containing portions of other modules. The packets arrive at a receiving station, where they are accumulated. When the last packet containing part of a particular module is received, that module is considered to have been received. Consequently, if it is necessary to deliver a module to a receiving station at a particular time, transmission of the module must begin at a time which is sufficiently early to allow transmission of all the packets containing portions of the module before the required delivery time.

The simple way of scheduling transmission of a module is to calculate (approximately) the time required to deliver the entire module and subtracting this from the scheduled delivery time. The duration of the transmission can be determined by dividing the size of the module by the bit rate at which its packets will be transmitted. This method scheduling the modules requires that the broadcast channel be reserved for this particular module and that all of the module's packets be transmitted consecutively. This constraint considerably increases the difficulty of scheduling the potentially large number of modules which may be required for an application. If packets of more than one module must be sent at the same time, the method fails. It may also be difficult, or even impossible, to schedule modules for delivery at or near the same time. Further, the accuracy with which the delivery time of a single module can be scheduled using this method is limited because, although the start time of the transmission is known, the actual duration of the transmission can only be estimated. An improved mechanism for scheduling delivery of the modules would therefore be desirable.

SUMMARY OF THE INVENTION

The invention comprises a system and method for scheduling the delivery of packetized modules from a transmitting station to a receiving station. The invention provides a mechanism which allows flexibility in scheduling delivery of modules while maintaining accurate determination of delivery times. The transmitting station begins transmission of a given module's packets at a time which is sufficiently early that all of the packets can be delivered before the module's scheduled delivery time. Transmission of the last packet is held until the scheduled delivery time and then transmitted. Because the module is considered to have been received at the receiving station when the last packet is received, the module's actual delivery time can be scheduled with the accuracy achievable with a single packet instead of the accuracy achievable when transmitting an entire module.

One embodiment of the invention comprises an interactive television system having a transmitting station (referred to herein as a broadcast station) which is coupled to one or more receiving stations by a broadcast channel. The broadcast station and receiving stations may also be coupled by point-to-point channels. The broadcast station is configured to format application modules or other data into packets (i.e., "packetize" them) and transmit the packets to the receiving station via the broadcast or point-to-point channels. The receiving station includes a set-top box configured to receive and store the packets until the entire module has been received.

The broadcast station contains a scheduler. The scheduler is provided with predetermined times at which modules should be delivered from the broadcast station to the receiving station. In one embodiment, a transmission interval is also provided to the scheduler. The interval is at least as long and preferably greater than the time which would be required to transmit the module's packets consecutively. The greater the transmission interval, the more flexibility the scheduler has to deliver the module's packets. An additional amount of flexibility in scheduling can be achieved by allowing the delivery of the module to fall within a range around the delivery time. (This flexibility is particularly helpful in instances in which transmission of two or more modules is overlapped.) The scheduler calculates a transmission start time based on the scheduled delivery time and the transmission interval. The scheduler begins transmission of the module at the calculated start time and completes transmission of all but the last packet before the scheduled delivery time. At the scheduled delivery time, the last packet is transmitted. When this packet is received by the receiving station, the complete module has been received and the actual delivery time is established.

In an alternate embodiment, the transmission interval may also be calculated. If only a single module is to be transmitted, the transmission interval may be calculated by dividing the size of the module by the transmission bit rate. If there are several modules to be transmitted simultaneously, the transmission interval may be calculated by dividing the aggregate size of the modules by the transmission bit rate. If the transmission of several modules is to be overlapped, the transmission intervals required to deliver the modules individually may be increased by a multiplier to account for the sharing of the delivery channel by the modules. Any other suitable method may also be used to calculate the transmission interval. In any case, all of the packets, except the last packet, of each scheduled module are transmitted beginning at the respectively calculated start times. Since the delivery time of a module is the delivery time of the corresponding last packet, the delivery times of the modules can be scheduled with a much greater accuracy than in the prior art. The modules may also be transmitted so that their delivery times are nearly the same, even when the modules are very large.

In another embodiment, the scheduling and even the packetization of the modules may be done in advance. The producer of a module may deliver a pre-scheduled and pre-packetized version of the module to the broadcast station, which would then multiplex the module's packets with other packets and transmit them according to the predetermined schedule. The other packets could contain audio, video, applications, or other types of information. The pre-scheduled, pre-packetized version of the module may itself include packets of audio, video, applications or other information. That is, these other packets may be included in the pre-scheduled, pre-packetized version of the module prior to delivery to the broadcast station.

BRIEF DESCRIPTION OF THE DRAWINGS

Other objects and advantages of the invention will become apparent upon reading the following detailed description and upon reference to the accompanying drawings in which:

FIG. 6 is a block diagram of a set-top box in one embodiment of the invention.

FIG. 7 is a diagrammatic representation of the signal transmitted from a broadcast station to a receiving station in one embodiment of the invention.

Figure 1:
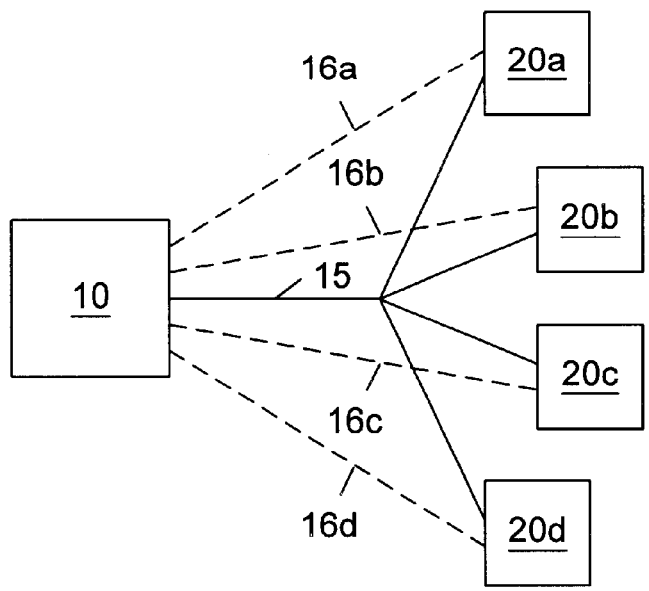
FIG. 1 is a block diagram illustrating the distribution of a broadcast signal from a broadcast station to a group of receiving stations in one embodiment of the invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

One embodiment of the invention is described below. In this embodiment, an interactive television receiving station accepts an audio-video-interactive signal via a broadcast channel such as direct satellite transmission. ("Direct" satellite transmission as used herein contemplates transmissions received by the interactive television receiver, more particularly by its antenna, directly from the satellite.) The audio-video-interactive signal contains television programs or similar audio-video content, as well as interactive content such as control signals or interactive applications. ("Broadcast" is used herein to refer to transmission of a single signal to all subscribing receivers.) The receiving station may also be configured to receive signals via a modem channel. The signals transmitted via the broadcast and modem channels may embody various modules which comprise components of an interactive application. The modules can contain any type of data, such as application code, raw data or graphical information.

The broadcast station includes a scheduler which controls the transmission of the modules to the receiving station. For each scheduled module, the scheduler is provided with a delivery time and sufficient information to calculate a transmission start time. In most cases, the scheduler is provided with a predetermined transmission interval for each module, so that determination of a start time is simply a matter of subtracting the interval from the delivery time. In other cases, the scheduler must calculate the transmission interval from other information, such as the demand for bandwidth on the transmission channels. This information may include module size, transmission bit rate, and number of modules which are to be transmitted at the same time. In still other cases, the start time, transmission interval and delivery time may all be predetermined and provided to the broadcast station. The scheduler causes all of the packets of a module, except the last packet, to be transmitted between the start time and the delivery time. The last packet is held until the delivery time and is then transmitted. The receiving station may include a module manager which tracks the incoming packets and determines when the last packet is received. When the last packet is received (i.e., at the scheduled delivery time,) the module is assigned a delivery time and is processed by the receiving station.

Referring to FIG. 1, a block diagram illustrating the distribution of a broadcast signal from a broadcast station 10 to a group of receiving stations 20 is shown. For the purposes of discussion, items referenced by the same number but different letters (e.g., 20*a*, 20*b*, 20*c*) will be collectively referred to by the number only (e.g., 20). ("Broadcast" is used herein to refer to transmission of a single signal to all subscribing receivers.) Broadcast channel 15 is depicted as a solid line extending from broadcast station 10 which branches out to each of the receiving stations 20. Broadcast channel 15 may comprise a direct satellite transmission channel or any known means for broadcasting a signal, including non-satellite, cable, telco, MMDS (microwave) and terrestrial transmissions. (A "direct" satellite transmission as used herein means a transmission received by the interactive television receiver directly from the satellite.). As depicted by the dashed lines in the figure, each of receiving stations 20 is also coupled to broadcast station 10 by a point-to-point channel 16. The point-to-point channels are independent and may carry different signals to each of the receiving stations. The point-to-point channels may comprise modem connections, portions of the broadcast channel bandwidth, or other suitable media. Point-to-point channels 16 may be used to allow feedback to be transmitted from receiving stations 20 to broadcast station 10, or they may be used as an alternate channel by which modules may be selectively transmitted from broadcast station 10 to particular ones of receiving stations 20.

Figure 2:
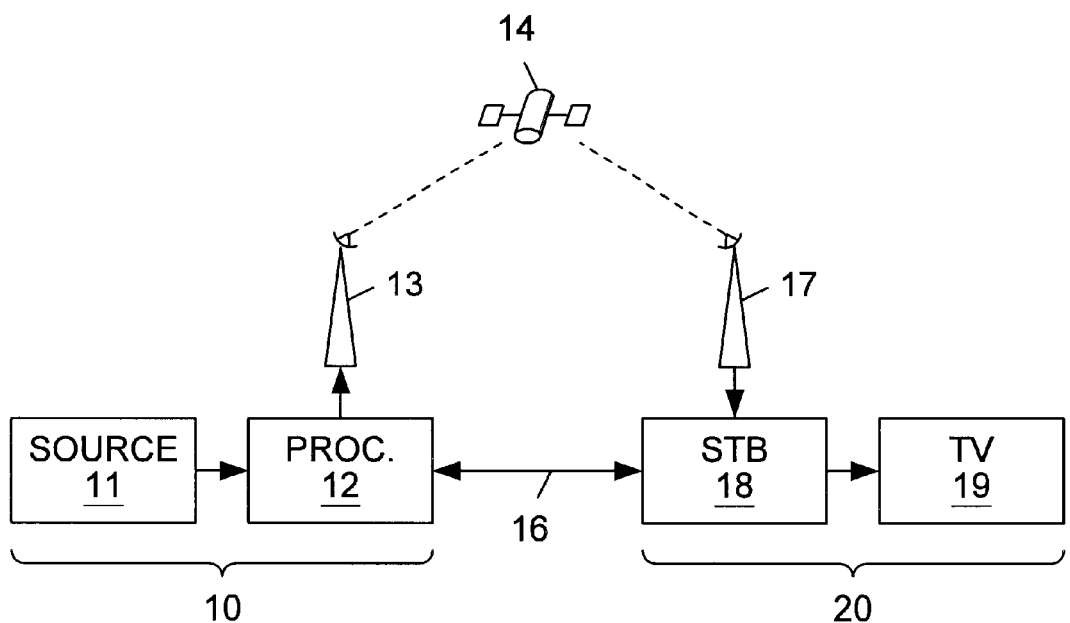
FIG. 2 is a block diagram illustrating the distribution of interactive television applications or television programs from a source to a viewer in one embodiment of the invention.

Referring to FIG. 2, a block diagram illustrating the distribution of interactive television applications or television programs from a source to a viewer is shown. Broadcast station 10 has a program source 11. This source may include remote broadcast network feeds, videotape recorders, computers, data storage devices, and the like. There may be multiple sources, but only one is depicted in the figure for purposes of simplicity. Source 11 may provide interactive applications, control information or audio/video information which is to be included in the interactive television signal. The information provided by source 11 is routed to processing system 12 of broadcast station 10. (Processing system 12 as used here refers to the various functional units of broadcast station 10 which will be described in more detail below.) Processing system 12 produces an output interactive television signal which is conveyed to broadcast station antenna 13. Broadcast station antenna 13 transmits the signal via communications satellite 14 to receiving station antenna 17. Receiving station antenna 17 passes the interactive television signal to set-top box 18, which performs the processing functions of receiving station 20. Set-top box 18 then reformats the received signal into a television signal (e.g., NTSC or HDTV) which is suitable for display on television 19 and/or executes the interactive television application embodied in the received signal.

In addition to the broadcast channel between the broadcast station and receiving station, there may be other channels, such as a modem channel (which may also be referred to as an http, or hypertext transfer protocol, channel.) These types of channels may serve two functions in the system: they may allow the set-top box to provide feedback to the broadcast station; and they may provide an alternate path for the broadcast station to deliver the interactive television signal to the receiving station.

Figure 3:
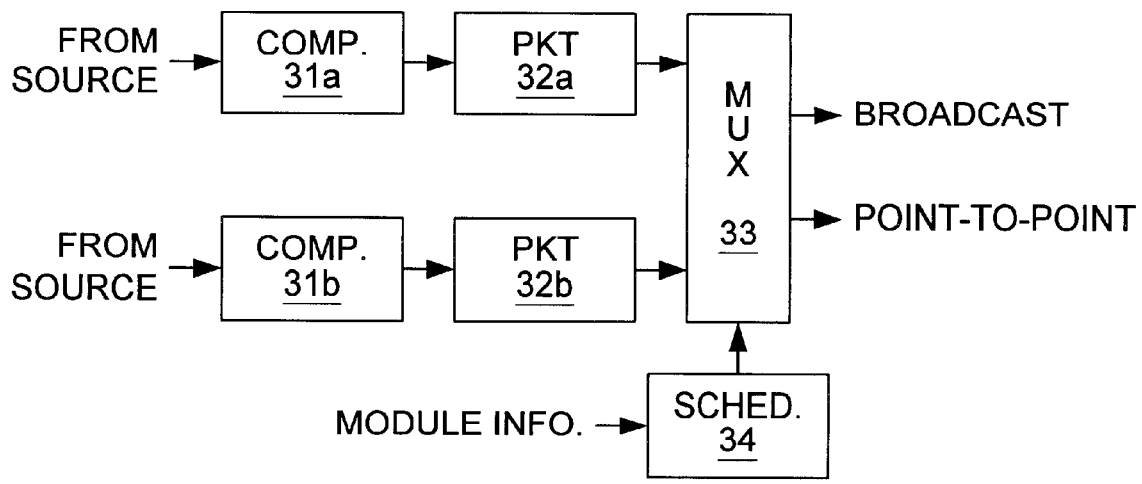
FIG. 3 is a block diagram illustrating components of a broadcast station signal processing system in one embodiment of the invention.

FIG. 3 illustrates some of the components which typically comprise processing system 12 of broadcast station 10. Often, information (such as audio and video signals) which is supplied to the processing system can be compressed so that it requires less bandwidth on the broadcast channel. This information is therefore typically routed through compression units 31 prior to transmission by the broadcast station. Other types of information may also be suitable for compression. Any of a number of compression algorithms, such as one of the Motion Picture Expert Group (MPEG) compression standards, may be used if appropriate for a particular program or application. Time stamps may also be added, for example, to synchronize associated audio and video signals. Some information, on the other hand, may not be easily or effectively compressed, and may be routed directly from the source to packetization unit 32 without compressing the information. Packetization units 32 accept the compressed (or uncompressed) information and format it into packets for transmission over the broadcast channel. The packetization of the information will be described in more detail below. The packets are fed into multiplexing unit 33, which intersperses the packets prior to transmission. The interspersed packets are then transmitted, under the control of scheduler 34, to the broadcast station antenna for broadcast to the receiving stations. It should be noted that the combination of multiplexing unit 33 and scheduler 34 does not only intersperse the packets, but may control transmission of the packets as necessary to achieve scheduled delivery of the modules.

Figure 4:
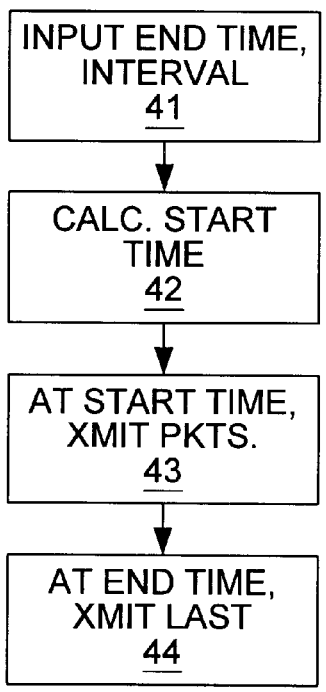
FIG. 4 is a flow diagram illustrating the operation of the scheduler in one embodiment of the invention.

Referring to FIG. 4, a flow diagram illustrating the operation of the scheduler is shown. When a module is to be transmitted by broadcast station, the module may need to be delivered at a particular time, although this may not be true of all modules. If a module does have a defined delivery time, this information is conveyed to the scheduler 41. The delivery time may be provided by a user, or it may be calculated by the scheduler itself. The scheduler may, for example, calculate a delivery time for a module which needs to be transmitted cyclically or which needs to be delivered at a certain time after another module. (The system information needed for calculation of the delivery time may be retained in a memory in the broadcast station.) In addition to the delivery time, the scheduler needs to have some other information to allow it to determine when to start transmission of the module's packets. In a simple case, the scheduler is explicitly provided with a transmission interval 41. In other words, a user may simply input the interval to the scheduler. The scheduler can then subtract the transmission interval from the delivery time to determine a transmission start time 42. The scheduler will control multiplexer so as to begin transmission of the packets to begin at the corresponding start time 43. ("Begin transmission" is used herein to indicate that the packets are transmitted at or after the start time.) The scheduler will continue to allow multiplexer to transmit the packets of the module until only one packet remains. The scheduler will prevent transmission of this packet until the delivery time. At the delivery time, the scheduler will allow the last packet to be transmitted to the receiving station 44.

In one embodiment, the scheduler is implemented in software. The software executes on a microprocessor or microcontroller in the broadcast station. In other embodiments, the scheduler may be implemented in software, firmware, hardware or a combination thereof. The software implementation is readily adaptable to alternate embodiments in which the delivery time and transmission interval are not explicitly provided to the scheduler. In these embodiments, the interval and start time may be calculated from information such as module size, transmission bit rate and number of modules being simultaneously transmitted. For example, the interval may be calculated by dividing the size of the module by the transmission bit rate and then multiplying it by the number of modules being transmitted at the same time. It is contemplated that many such algorithms for determining the interval, start time and/or delivery time will be obvious to persons of skill in the art of the invention.

The scheduler may consist of a delivery time calculator, a start time calculator and a controller. (It should be noted that such functional components are illustrative and that the implementation of the scheduler may vary from one embodiment to another.) The delivery time calculator may calculate the delivery time from information stored in or generated by the system, or it may simply accept the delivery time as user input. The start time generator may calculate the start time from a user-provided transmission interval or from a calculated interval, or it may accept the start time as user input. The delivery time and start time calculators provide the delivery/start time information to the controller. In alternate embodiments, the delivery, start time, transmission interval or other information may be provided to the broadcast station with a pre-scheduled (and possibly pre-packetized) version of the module to be delivered. The controller uses this information to manage transmission of the modules' packets. As shown in FIG. 3, the scheduler is coupled to the multiplexer in order to control the flow of packets through the multiplexer to the broadcast and point-to-point channels.

The audio-video-interactive transmission from the broadcast station to the interactive television receiver comprises a series of packets. As described above, the packets which form a given module are typically time multiplexed with other information. That is, they are interspersed or interleaved with other packets. The packets of the respective modules need not be multiplexed in any particular ratio (e.g., 1:1.) This information may consist of packets of another module or compressed audio or video. The packets which are received by the interactive television receiver are reconstructed into their respective application modules.

Figure 5:
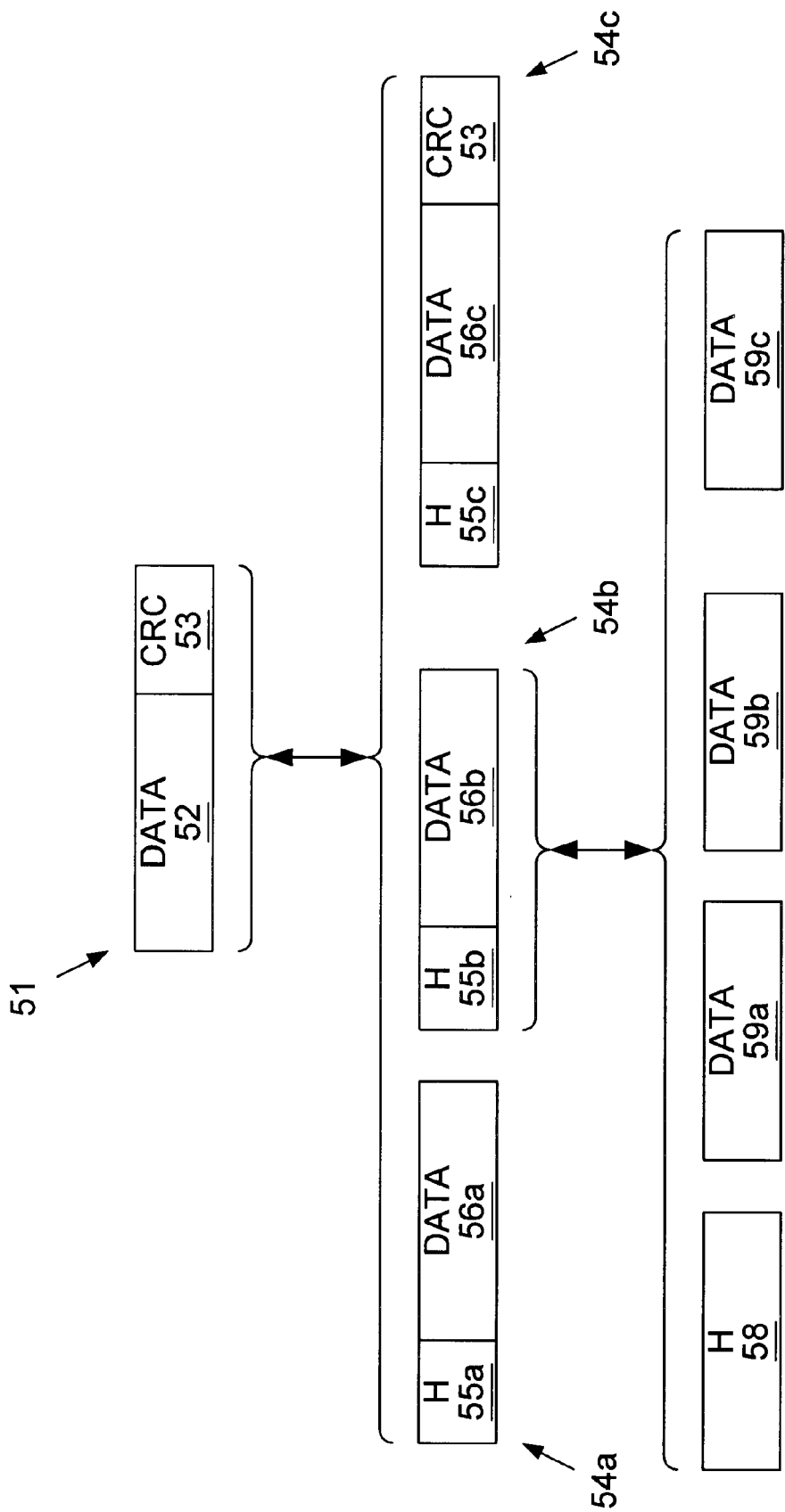
FIG. 5 is a block diagram illustrating the manner in which the data comprising a module is packetized in one embodiment of the invention.

Referring to FIG. 5, each module 51 has a data segment 52 and a CRC segment 53. The data segment 52 of the module can contain any type of data, such as application code, module directory information or raw data. The CRC segment 53 of each of the module is used for error control and is computed for the entire module 51. Each module 51 normally has a unique identifier. Module 51 is normally broken down into smaller pieces to facilitate transmission of the module. In one embodiment, module 51 is broken down into transmission units and then packetized (formatted into packets) for transmission on the broadcast channel. The description below is directed to one embodiment of this mechanism which is intended to be illustrative rather than limiting.

Before a module 51 is transmitted, it is formatted into transmission units 54. Each of the transmission units 54 contains header information 55, which uniquely identifies that transmission unit 54 within the stream of transmission units, and data 56 which comprises a portion of the module being transmitted. The header 55 contains information such as the module ID, module offset and size, which allow the transmission units 54 to be reconstructed into a complete module. The transmission units 54 comprising a particular module 51 may be interleaved with other transmission units 54 in the transmission stream. The last transmission unit 54 for a module 51 carries the CRC 53.

The format of the transmission units 54 is dependent upon the transmission medium, but typically employs a series of packets of fixed length (the last packet may be padded to obtain the proper length.) In one embodiment, the first packet 58 in the series carries the header information as well as data for the transmission unit 54. Similar packets carry the remainder of the transmission unit data. In an alternate embodiment, the header packet 58 may be an auxiliary packet which can generate an interrupt in the CPU. The auxiliary packet contains information to enable the CPU to determine whether the module 51 should be decoded and where it should be loaded into memory.

It should be noted that, while the foregoing description uses the term "packet" in a conventional sense, it is contemplated that the invention is equally applicable in the transmission of other module segments. The use of this term is therefore intended to refer to all such subdivisions of the modules.

As described above, the broadcast signal is collected by receiving station antenna 17 and fed to set-top box 18. Set-top box 18 processes the packetized signal to reconstruct the television programs and interactive applications embodied in the signal. The reconstructed applications are executed in the set-top box, while the reconstructed television programs are passed to the television, where they are displayed. The interactive applications may generate graphics or audio which are combined with the television program prior to being displayed.

Referring to FIG. 6, a block diagram of a set-top box is shown. The broadcast signal is received and fed into tuner 61. Tuner 61 selects the channel on which the broadcast audio-video-interactive signal is transmitted and passes the signal to processing unit 62. (Tuner 61 may be replaced by other means, all collectively referred to herein as input ports, for receiving signals from various signal sources.) Processing unit 62 demultiplexes the packets from the broadcast signal if necessary and reconstructs the television programs and/or interactive applications embodied in the signal. The programs and applications are then decompressed by decompression unit 63. The audio and video information associated with the television programs embodied in the signal is then conveyed to display unit 64, which may perform further processing and conversion of the information into a suitable television format, such as NTSC or HDTV audio/video. Applications reconstructed from the broadcast signal are routed to random access memory (RAM) 67 and are executed by control system 65. A module manager unit 60 is contained within control system 65. In one embodiment, module manager unit 60 is implemented in software, but it may also be implemented in hardware or a combination of hardware and software.

Control system 65 may include a microprocessor, microcontroller, digital signal processor (DSP), or some other type of software instruction processing device. RAM 67 may include memory units which are static (e.g., SRAM), dynamic (e.g., DRAM), volatile or non-volatile (e.g., FLASH), as required to support the functions of the set-top box. When power is applied to the set-top box, control system 65 executes operating system code which is stored in ROM 66. The operating system code executes continuously while the set-top box is powered in the same manner the operating system code of a typical personal computer (PC) and enables the set-top box to act on control information and execute interactive and other applications. The set-top box may also include modem 68. Modem 68 provides both a return path by which viewer data can be transmitted to the broadcast station and an alternate path by which the broadcast station can transmit data to the set-top box.

Although the term "set-top box" is used herein, it is understood that this term refers to any receiver or processing unit for receiving and processing a transmitted signal and conveying the processed signal to a television or other monitor. The set-top box may be in a housing which physically sits on top of a television, it may be in some other location external to the television (e.g., on the side or back of the television or remotely located from the television), or it may be incorporated into the television itself. Set-top box 18 serves to demodulate the signal received from broadcast station 10 and to separate the components of the signal, such as different television programs and interactive applications. Similarly, television 19 may be a television or a video monitor employing any suitable television format (e.g., NTSC or HDTV), or it may be replaced by other devices, such as a video recorder.

The receiving station is operatively connected to the broadcast station by a broadcast channel. This broadcast channel could utilize various transmission media and is contemplated to include media such as coaxial cable and free space (e.g., as used for direct satellite transmissions.) The broadcast channel forms a transmission path between the broadcast station and the receiving station. The broadcast station and receiving station are also connected by a return path. The return path typically consists of a pair of modems, one in the receiving station and one in the broadcast station, each connected to a standard telephone line. Other means for establishing a return path, e.g., using a portion of the bandwidth of the transmission path, are also contemplated.

Referring to FIGS. 7a and 7b, a diagrammatic representation of the signal transmitted from broadcast station 10 to receiving station 20 is shown. The figures depict the packets of two modules transmitted in a consecutive mode of operation (FIG. 7a) and a simultaneous mode of operation (FIG. 7b). In FIG. 7a, all of the packets of a single module (Mod. 1) are to transmitted consecutively. The scheduler can schedule transmission of the packets by determining the transmission interval ($I_1$) and subtracting this interval from the scheduled delivery time ($D_1$) to get start time ($S_1$). $I_1$ can be explicitly provided to the scheduler, or it can be calculated, for example, by dividing the module size by the transmission bit rate as explained above. Transmission of the packets can therefore begin at $S_1$ and should be complete in time to deliver the last packet at D1. This assumes that no errors occur and no retransmissions are required. $I_1$ can alternatively be calculated to include sufficient time to allow for errors and retransmissions. A second module (Mod. 2) can be scheduled in the same manner for transmission after the first module. While this mode of operation may appear to be similar to scheduling in the prior art, it is distinct because the last packet of each module is held until the delivery time. Thus, if the transmission interval is greater than the minimum time required to transmit all of the packets, the same delivery time (D1, D2) is maintained, while in prior art systems the delivery time would vary with the unused time in the interval.

In another mode of operation, illustrated in FIG. 7b, two modules can be transmitted simultaneously. ("Simultaneously," as used here, refers to the overlapping of at least a portion of the modules and does not require that the transmission of the respective modules' packets begin and end at the same time.) In this figure, both modules are scheduled for delivery at approximately the same time ($D_1$, $D_2$). For each module, a transmission interval is determined. Again, the interval can be explicitly provided, or it can be calculated by the scheduler based on bandwidth demand. In this instance, each module has an equal interval, resulting in start times ($S_1$, $S_2$) which are approximately the same. As noted above, in various embodiments, any or all of the scheduling information may be explicitly provided to the broadcast station. Further, the packets depicted as a single module in FIGS. 7a and 7b may alternately consist of pre-multiplexed packets containing modules, audio, video or other information. The pre-multiplexed packets may then be re-multiplexed by the broadcast station or simply transmitted consecutively.

The signal which embodies the packets is received by set-top box 18. Set-top box 18 demultiplexes the packets and reconstructs the respective television programs and modules. As noted above, the modules are stored in RAM 67, where they are available for use by applications executing in the control system 65. The set-top box may employ a security mechanism to ensure that the carousels and/or particular modules which are being downloaded are authentic. A certificate system may be used to ensure that the modules are produced by authorized producers and that the modules have not been altered before being received by the set-top box.

In one embodiment, the module manager unit controls delivery, access and other functions of the set-top box which relate to the modules. The module manager unit may be implemented in software, hardware or a combination of both as a matter of design choice. The module manager unit monitors the channels through which it is coupled to the broadcast station. As described above, these channels may carry broadcast signals, http signals, modem communications or other types of input signals. In one embodiment, all the packets of a particular module must be transmitted over the same channel. In other embodiments, the module manager unit may be configured to accept packets of a particular module from multiple channels (e.g., both a broadcast channel and a point-to-point channel.)

As the packets of one or more modules are transmitted to the set-top box, the module manager unit stores the packets so they can be reconstructed into the respective modules. The module manager unit also monitors the packets to determine whether the last packet of a module has been received. When the last packet of a module is received, the delivery time of the module is recorded. The module can then be reconstructed from its packets and processed by the set-top box. If the module is part of an application, it may be loaded into memory for execution. If the module consists of graphical information, it may simply be displayed on the television coupled to the set-top box.

While the present invention has been described with reference to particular embodiments, it will be understood that the embodiments are illustrative and that the invention scope is not limited to these embodiments. Many variations, modifications, additions and improvements to the embodiments described are possible. These variations, modifications, additions and improvements may fall within the scope of the invention as detailed within the following claims.

What is claimed is:

1. A method, implemented in an interactive television system having a broadcast station coupled to a receiving station by a transmission medium, for delivering modules to the receiving station according to scheduled delivery times, the method comprising:

providing a module to said broadcast station, said module having a corresponding delivery time;

formatting said module in one or more packets;

holding a last one of said one or more packets in said broadcast station;

transmitting all of said one or more packets except said last one of said packets from said broadcast station to said receiving station prior to said delivery time;

transmitting said last one of said one or more packets from said broadcast station to said receiving station at said delivery time.

2. The method of claim 1 further comprising providing said delivery time to said broadcast station as user input.

3. The method of claim 1 further comprising calculating said delivery time based on system information maintained by said broadcast station.

4. The method of claim 1 further comprising providing a transmission interval to said broadcast station as user input;

calculating a start time by subtracting said transmission interval from said delivery time; and beginning transmission of said one or more packets except said last one of said packets at said start time.

5. The method of claim 1 further comprising calculating a transmission interval for said module based on bandwidth demand;

calculating a start time by subtracting said transmission interval from said delivery time; and beginning transmission of said one or more packets except said last one of said packets at said start time.

6. The method of claim 1 wherein transmitting said packets of said module comprises time multiplexing said packets of said module with one or more packets of at least one additional module and transmitting said time multiplexed packets from said broadcast station to said receiving station.

7. The method of claim 1 wherein formatting said module in one or more packets comprises formatting said module in said one or more packets prior to said providing said module to said broadcast station.

8. The method of claim 7 wherein said providing said module to said broadcast station comprises providing a pre-packetized and prescheduled version of said module to said broadcast station, said pre-packetized and prescheduled version of said module including an explicit start time and an explicit delivery time.

9. the method of claim 8 wherein said pre-packetized and prescheduled version of said module includes one or more packets containing non-module information.

10. An interactive television system comprising:

a receiving station;

a broadcast station; and a transmission medium;

wherein said broadcast station is configured to transmit one or more modules, each module having a corresponding delivery time at which each said module is scheduled to be delivered to said receiving station, each of said modules being transmitted in one or more packets; and wherein for each module, said broadcast station is configured to transmit all but a last one of said one or more packets prior to said corresponding delivery time and wherein said last one of said one or more packets is transmitted at said corresponding delivery time.

11. The interactive television system of claim 10 wherein said transmission medium comprises a broadcast channel.

12. The interactive television system of claim 11 wherein said transmission medium further comprises a point-to-point channel.

13. The interactive television system of claim 11 wherein said packets are transmitted over both said broadcast channel and said point-to-point channel.

14. The interactive television system of claim 10 wherein said broadcast station is configured to accept user input which defines said delivery time.

15. The interactive television system of claim 10 wherein said broadcast station is configured to accept user input which defines a transmission interval sufficient to transmit all but said last one of said one or more packets, wherein said broadcast station is further configured to calculate a start time by subtracting said transmission interval from said delivery time, and wherein said broadcast station is configured to transmit said packets beginning at said start time.

16. The interactive television system of claim 7 wherein said broadcast station is configured to calculate a transmission interval sufficient to transmit all but said last one of said one or more packets based on a level of bandwidth demand for said transmission medium, wherein said broadcast station is further configured to calculate a start time by subtracting said transmission interval from said delivery time, and wherein said broadcast station is configured to transmit said packets beginning at said start time.

17. A scheduler coupled to a transmitting station for controlling delivery of modules from the transmitting station to a receiving station wherein the modules are broken down into packets prior to transmission and wherein an actual delivery time of each module is determined by the time of arrival of a last packet at the receiving station, the scheduler comprising:

a delivery time calculator;

a start time calculator; and a controller coupled to said delivery time calculator and said start time calculator, said controller being configured to receive a scheduled delivery time from said delivery time calculator and a scheduled start time from said start time calculator, said start time and said delivery time corresponding to a module, said controller being coupled to said transmitting station and configured to cause said transmitting station to begin transmission of one or more packets of said module at said scheduled start time, said controller being further configured to delay transmission of a last one of said packets and to transmit said last one of said packets at said scheduled delivery time.

18. The scheduler of claim 17 wherein said delivery time calculator is configured to accept a first explicit time provided by a user and to provide said first explicit time to said controller as said scheduled delivery time.

19. The scheduler of claim 18 wherein said start time calculator is configured to accept a second explicit time provided by a user and to provide said second explicit time to said controller as said scheduled start time.

20. The scheduler of claim 18 wherein said start time calculator is configured to accept a transmission interval provided by a user and to calculate said scheduled start time based on said transmission interval.

21. The scheduler of claim 17 wherein said start time calculator is configured to calculate a transmission interval based on a level of bandwidth demand for the transmitting station and to calculate said scheduled start time based on said transmission interval.

22. An interactive television system comprising:

a receiving station;

a broadcast station coupled to said receiving station and configured to transmit one or more modules to said receiving station, each of said one or more modules having a corresponding delivery time;

a packetizer configured to format each said module into one or more packets;

a scheduler coupled to said broadcast station, wherein said scheduler is configured to determine a start time for each module, wherein said scheduler is configured to begin transmitting said one or more packets of said each module at said start time wherein said scheduler is configured to complete transmission of all but a last one of said one or more packets prior to said delivery time and wherein said scheduler is configured to hold said last one of said one or more packets until said corresponding delivery time and to transmit said last one of said one or more packets at said delivery time.

* * * * *